United States Patent
Hardin et al.

(10) Patent No.: US 7,970,042 B2
(45) Date of Patent: Jun. 28, 2011

(54) SPREAD SPECTRUM CLOCK INTEROPERABILITY CONTROL AND INSPECTION CIRCUIT

(75) Inventors: Keith Bryan Hardin, Lexington, KY (US); Robert Aaron Oglesbee, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 771 days.

(21) Appl. No.: 12/013,062

(22) Filed: Jan. 11, 2008

(65) Prior Publication Data

US 2009/0179678 A1    Jul. 16, 2009

(51) Int. Cl.
  *H04B 1/00* (2006.01)
  *H03D 3/24* (2006.01)
(52) U.S. Cl. .................. 375/149; 375/140; 375/147
(58) Field of Classification Search .................. 375/149, 375/140
  See application file for complete search history.

(56) References Cited

U.S. PATENT DOCUMENTS

| | | | |
|---|---|---|---|
| 5,488,627 A * | 1/1996 | Hardin et al. .................. 375/139 |
| 5,491,458 A | 2/1996 | McCune, Jr. et al. |
| 5,533,046 A * | 7/1996 | Lund .............................. 375/130 |
| 5,631,920 A | 5/1997 | Hardin |
| 5,867,524 A * | 2/1999 | Booth et al. .................. 375/130 |
| 5,872,807 A | 2/1999 | Booth et al. |
| 6,131,013 A * | 10/2000 | Bergstrom et al. ........... 455/63.1 |
| 6,167,103 A | 12/2000 | Hardin |
| 6,292,507 B1 | 9/2001 | Hardin et al. |
| 6,404,834 B1 | 6/2002 | Hardin et al. |
| 6,658,043 B2 | 12/2003 | Hardin et al. |
| 6,980,581 B1 * | 12/2005 | Sha et al. ....................... 375/130 |
| 7,558,348 B1 * | 7/2009 | Liu et al. ........................ 375/346 |
| 2003/0081653 A1 * | 5/2003 | Hardin et al. .................. 375/130 |
| 2004/0213324 A1 * | 10/2004 | Hall et al. ...................... 375/130 |
| 2005/0010269 A1 * | 1/2005 | Lebel et al. ...................... 607/60 |
| 2006/0056491 A1 * | 3/2006 | Lim et al. ....................... 375/130 |
| 2008/0063130 A1 * | 3/2008 | Chen .............................. 375/376 |
| 2008/0107154 A1 * | 5/2008 | Hsiao-Chyi .................... 375/130 |
| 2009/0089842 A1 * | 4/2009 | Perry et al. ....................... 725/78 |

\* cited by examiner

*Primary Examiner* — Dac V Ha
*Assistant Examiner* — Erin M File
(74) *Attorney, Agent, or Firm* — Justin M. Tromp; John Victor Pezdek

(57) ABSTRACT

A spread spectrum clock generator (SSCG) control and inspection circuit provides a system and method for inspecting and controlling an external SSCG, and for verifying the modulation profile waveform of an external SSCG. An electronic circuit is included that can check for the presence of an optimal SSCG modulation profile in product subsystems, and in attached modular systems, including electronic plug-in features such as internal network adapters and cartridges. In one mode of the invention, an electronic circuit ensures continued radiated emissions compliance for field replaceable units or consumable parts within a product, such as a printer, a scanner, or a combination (or all-in-one) printer/scanner. In another mode of the invention, an electronic circuit may also act as a secondary security device for consumable products, such as toner cartridges or ink jet cartridges. In yet another mode of the invention, an electronic circuit may also adjust the attached SSCG clock.

23 Claims, 15 Drawing Sheets

SPREAD SPECTRUM CLOCK INTEROPERABILITY CONTROL AND INSPECTION CIRCUIT

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to spread spectrum clock generator (SSCG) circuits, and more particularly provides a system and method for inspecting and controlling an external spread spectrum clock generator, and for verifying the modulation profile waveform of an external spread spectrum clock generator. The invention includes an electronic circuit that has the ability to check for the presence of an optimal or "Lexmark" SSCG modulation profile in product subsystems, and in attached modular systems, including electronic plug-in features such as internal network adapters and cartridges. In one mode of the invention, an electronic circuit ensures continued radiated emissions compliance for field replaceable units or consumable parts within a product, such as a printer, a scanner, or a combination (or all-in-one) printer/scanner. In another mode of the invention, an electronic circuit may also act as a secondary security device for field replaceable units, such as toner cartridges, ink jet cartridges, fuser units or developer units. In yet another mode of the invention, an electronic circuit may also adjust the attached SSCG clock.

2. Description of the Related Art

Spread Spectrum Clock Generation (SSCG) has been used successfully to reduce radiated emissions from electronic systems. SSCG is a clock that uses either a frequency modulation technique or a phase modulation technique that intentionally changes a system clock from a narrowband operational frequency to a broadband range of operational frequencies. This has the effect of spreading out energy over multiple frequencies, thereby reducing the emissions at any single frequency compared to the original un-modulated clock signal. Such circuits have been described in various patents, including U.S. Pat. Nos. 5,488,627, 5,491,458, and 5,631,920.

An optimal method of creating an SSCG clock is discussed in two of the above-noted patents (U.S. Pat. Nos. 5,488,627 and 5,631,920, which are assigned to Lexmark International, Inc.), and those Lexmark patents are incorporated by reference in their entirety. This optimal "Lexmark method" of generating a spread spectrum clock has many advantages: repeatability of the modulation waveform, simplicity of the implementation architecture, and chiefly, a greater EMI reduction that is achieved compared to other non-optimal modulation waveforms. In particular, a Lexmark SSCG clock may have twice the EMI attenuation of a non-Lexmark SSCG clock.

In U.S. Pat. No. 5,488,627, the optimal modulation profile was described as being contained between a triangular (linear) modulation shape and a cubic modulation shape. FIG. 1 hereof is taken from that patent, and shows a range of optimal profiles, with F3 and F4 being the inclusive bounds. The preferred modulation profile discussed in U.S. Pat. No. 5,488,627 is the curve that is designated F5, which of course fits within the bounds F3 and F4.

Since there can be several dB difference between the EMI attenuation of an optimal modulation profile and a sub-optimal one, the usage of a particular profile may determine whether a product is in compliance with the relevant radiated emissions requirements of a particular country (i.e., the FCC in the United States, or CISPR in the EU). Imagine, as an example, a product that has a clock operating at 500 MHz and uses an optimal Lexmark SSCG which is 2 dB below the limit mandated by the regulatory agencies. If this product uses a subsystem that generates the clock, imagine the subsystem is now replaced by a generic (non-optimal) 500 MHz SSCG clock system. The emissions at 500 MHz may increase by 2.5 dB for a narrow spread (for a 0.5% deviation, typical of many PCs), causing the product to fail the emissions limits by 0.5 dB. If the default clock exhibited a wider deviation (such as a 3.75% deviation, typical for many printer products) then the dB difference would be even greater.

Another case where the control of the SSCG profile is important is where multiple systems within a single product each have separate SSCG clocks. When multiple systems are added together, the radiated emissions from each system also add together. If one or more of these added systems do not have an optimal SSCG profile, it could cause the product to fail radiated emissions limits. Therefore, a method of detecting the presence of an optimal SSCG profile (such as a Lexmark compatible SSCG clock) in the subsystem is desirable. Once the presence of a Lexmark compatible SSCG clock is detected, adjustment of the subsystem clock can be performed.

SUMMARY OF THE INVENTION

A clock interoperability circuit is provided that can adjust subsystem SSCG clocks by use of a master clock coordinator to compensate for process variations in the subsystem clock generator.

A clock interoperability circuit is provided that can adjust subsystem SSCG clock frequencies to prevent frequency overlap between multiple subsystem SSCG clocks.

A clock interoperability circuit is provided that provides verification that additional attached systems or subsystems will perform as well as the originally certified hardware, and will comply with radiated emissions limits.

A clock interoperability circuit is provided that acts as a supplementary security device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
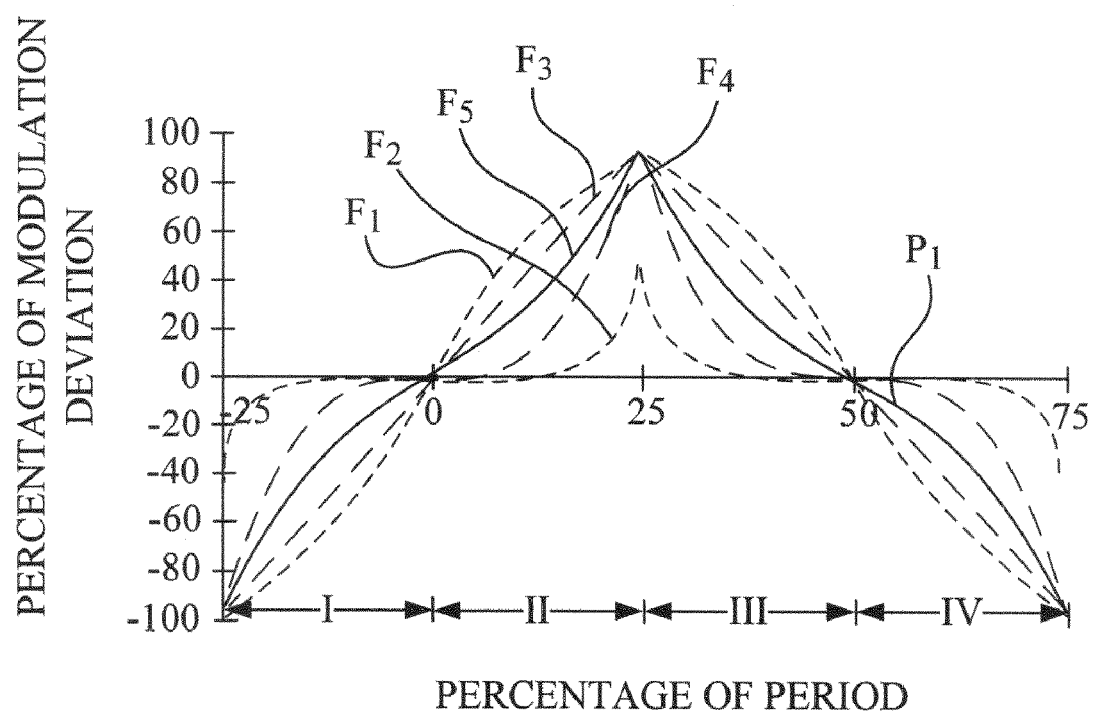
FIG. 1 is a graph of a spread spectrum clock generator modulation profile envelope, showing an exemplary modulation profile as known in the prior art.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware.

One of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention.

To accurately detect an SSCG profile, a demodulation circuit (or a demodulation function of a software-driven processing device) is used to extract the modulating waveform from a data or clock signal. The demodulation circuit is fed into a wave shape detection circuit (or wave shape detection function of a processing device) that identifies various characteristics of the modulation waveform to determine if the SSCG system meets the required specifications. The demodulation circuit may be a digital or an analog circuit that may also require some processing capability. The demodulation circuit (or function) outputs a result, which is a voltage or current, or a digital signal (or a digital numeric value) that represents the modulation waveform of the SSCG signal. The wave shape detection circuit uses the output of the demodulation circuit to compare a predetermined set of characteristics to result in an evaluation which gives a probability that the SSCG profile meets the required specification. The wave shape detection circuit can also provide an output that feeds back to the SSCG circuit that is creating the SSCG on how to adjust its output to be within the required specification.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). As noted above, the demodulation circuit could be an analog circuit or a digital circuit of some type, although such a "demodulation circuit" possibly could be implemented in software by a logic state machine or a sequential processor. In other words, if a processing circuit is used to perform a desired function used in the present invention (such as a demodulation function), then there might not be a specific "circuit" that could be called a "demodulation circuit;" however, there would be a demodulation "function" that is performed by the software. All of these possibilities are contemplated by the inventors, and are within the principles of the present invention when discussing a "circuit."

Figure 2A:
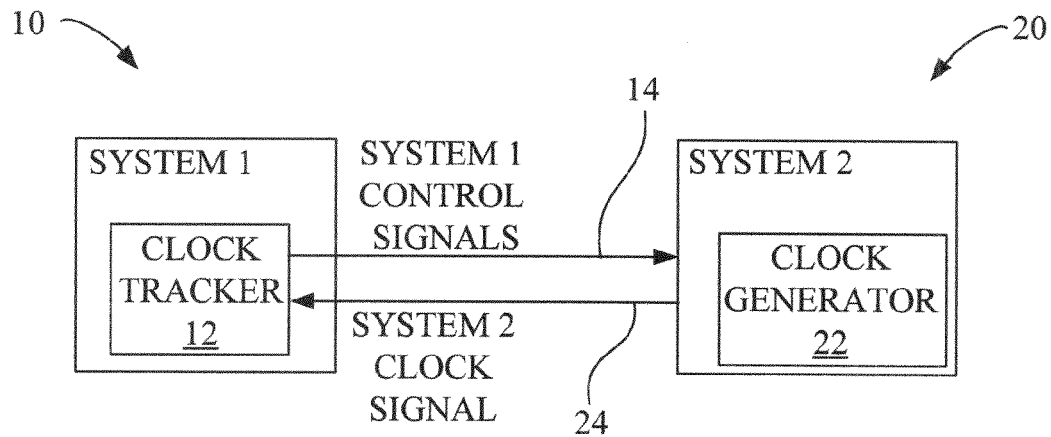
FIG. 2A is an example block diagram of system interconnections between a first system having a clock tracker circuit and a second system having a clock generator circuit, used as a clock interoperability system, as constructed according to the principles of the present invention.

Most embodiments of the clock interoperability system of the present invention include at least one clock generator and a clock tracking generator. The clock generator may be present on a subsystem or a modular attached system. In FIG. 2A, the clock tracking generator (or "clock tracker") 12 is located on a "System 1" at reference numeral 10, and the clock generator 22 is on a "System 2" at reference numeral 20. The clock tracker 12 recreates the clock from System 2 (via a clock signal 24) and compares it against a predetermined mask. If the recreated clock does not fit within the bounds of the mask, action is taken to modify the characteristics of the System 2 clock 22, or to notify the user that there is a problem with the system. A control signal 14 is used to instruct the System 2 clock at 20 as to how to modify its characteristics. However, System 1 (at 10) does not necessarily need to communicate to System 2 (at 20), for example, if modifying the characteristics of System 2 is not possible. If System 2 is a subsystem that is manufactured by a different company than the clock tracker 12 of System 1, then System 2 may have a clock generator 22 that either cannot be modified, or will not accept commands from the control signal 14, output by System 1.

Figure 2B:
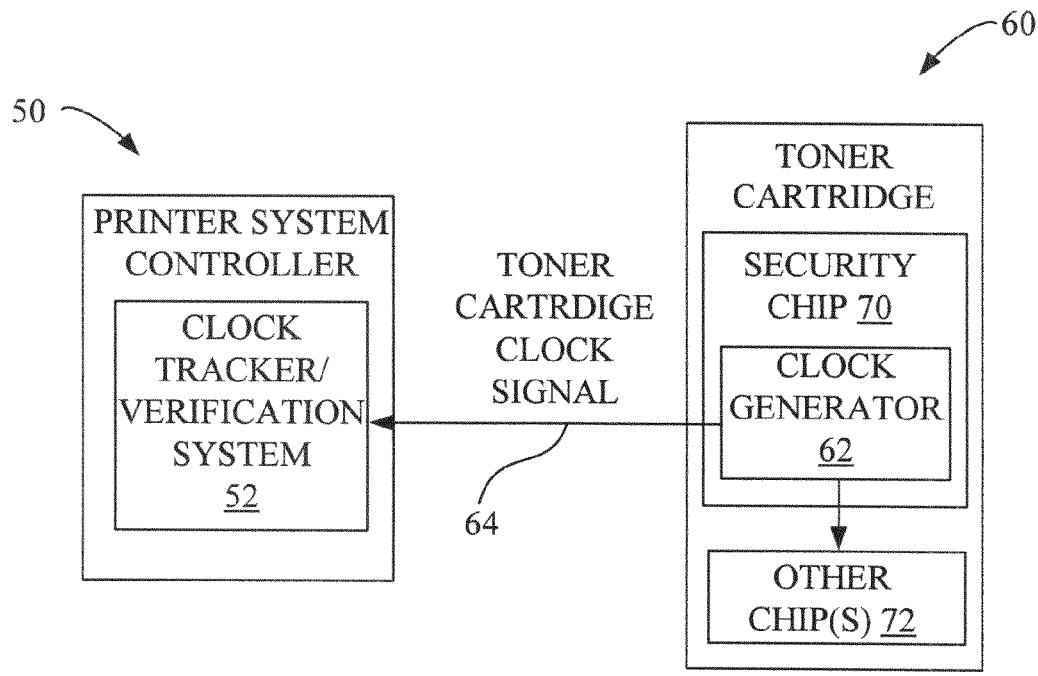
FIG. 2B is a block diagram showing a printer system controller circuit and an associated toner cartridge circuit, using the clock tracker/verification system of the present invention as a supplementary security system for verifying the toner cartridge.

FIG. 2B shows a specific high-level example of the present invention. In FIG. 2B, the SSCG clock and tracking generator is used as a secondary security system. A third-party field replaceable unit such as a toner cartridge may sometimes be used in a printer by a customer. This potentially results in diminished print quality or damaged printers. In addition, if clocking circuits are provided as part of the electronics used on the cartridge, electromagnetic emissions may also increase. In order to prevent this, security devices have been developed that mate to the electronics on the field replaceable unit such as a toner cartridge. The present invention may be added to these security devices for two purposes. The first purpose is to provide a low EMI clock to some or all of the circuitry on the field replaceable unit. The second purpose is to provide another method to verify that the field replaceable unit is authentic.

In FIG. 2B, a system controller of a printer is designated by the reference numeral 50. The printer controller 50 includes a clock tracker/verification system 52. A field replaceable unit such as toner cartridge is generally designated by the reference numeral 60, and includes a security chip 70. Security chip 70 includes a clock generator 62, which outputs a clock signal at 64. The clock generator 62 can also output its clock signal to other circuit devices on the toner cartridge, which are generally designated by the reference numeral 72.

The printer system controller 50 is expecting a valid toner cartridge 60 to be mated to the printer. Assuming that there is a valid toner cartridge 60, the clock generator 62 would be outputting a clock signal at 64 that has a predetermined spread spectrum clock signal that exhibits certain characteristics that can be checked by the clock tracker/verification system 52. This would verify that a correct toner cartridge has been inserted into the printer. On the other hand, if the field replaceable unit such as the illustrated toner cartridge 60 is not a valid toner cartridge for this printer, then the field replaceable unit clock signal (e.g., toner cartridge clock signal 64) would not pass a verification test performed by the clock tracker/verification system 52. The printer 50 can then act accordingly such as providing an error message or other predetermined action. This is another methodology for validating a field replaceable unit such as the toner cartridge 60.

It will be understood that the toner cartridge 60 of FIG. 2B is only one possible example of a "System 2" device 20 that could be attached to a "System 1" device 10. For example, if the System 1 device is a printer main body with a printer system controller (such as the printer system controller 50 of FIG. 2B), then the System 2 device 20 could be virtually any field-replaceable unit that might contain an electronic chip of some type. This includes, but is not limited to, toner cartridges (for electrophotographic printers), ink cartridges (for ink jet printers), developer units, fusing units, paper input feeders (such as paper trays or bins), paper output handlers (such as output bins or collators), image transfer members, photoconductive elements (such as PC drums and the like used in electrophotographic printers), and ink nozzle subassemblies (that could include the resistive heater elements and the "jet" nozzle elements, as well as other possible components that might be located on a substrate or ribbon structure).

Figure 3:
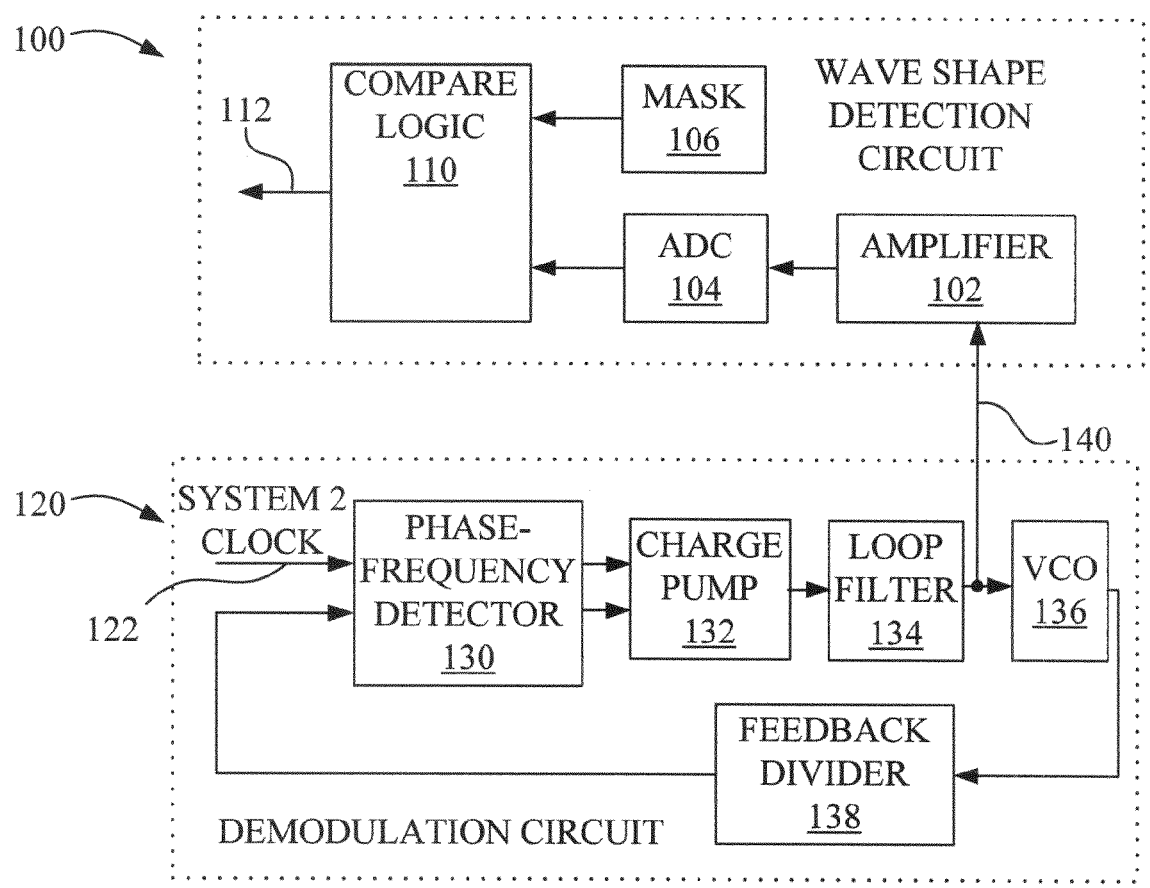
FIG. 3 is a block diagram of a first embodiment of a clock tracker/verification system (a clock interoperability system) of the present invention, using the VCO input voltage as the comparison vehicle.

A first embodiment is illustrated in FIG. 3, in which a clock tracker system is generally designated by the reference numeral 100. The system 100 is connected to a third order phase-locked loop (PLL) 120. There are some additional components that are connected to nodes within the PLL 120 to monitor the modulation profile shape. In this first embodiment, a typical tracking PLL is used. However, an amplifier 102 is attached to the node 140 between the loop filter 134 and the voltage controlled oscillator (VCO) 136. This node is a voltage signal (at 140) that controls the output frequency of the VCO 136. The characteristics of the input clock (i.e., the System 2 clock), within the limits of the reproduction ability of the tracking PLL, are present at this node 140 as a voltage variation. On FIG. 3, the System 2 clock signal is present at the signal line 122, and is directed to a phase-frequency detector 130. The two outputs from the phase-frequency detector are directed to a charge pump 132, and its output is directed to the loop filter 134. The VCO has a signal that is directed to a feedback divider 138, and its signal is directed back to the phase-frequency detector 130.

The variable voltage signal 140 is directed to the amplifier 102, and its amplified output is directed to a wave shape detection circuit. (It should be noted that amplification is not always necessary, and therefore, the amplifier 102 may not be present in all designs.) The wave shape detection circuit is implemented in this embodiment by using an analog-to-digital converter (ADC) 104 that converts the analog voltage signal into a digital signal, and the output of the ADC 104 is directed to comparison logic 110. A predetermined "mask" 106 is provided and its signal is also directed to the compare logic 110. The predetermined mask 106 contains the minimum and maximum allowable profile envelope for the System 2 clock signal 122. The compare logic circuit 110 also takes care of aligning the measured profile shape with the mask.

One advantage of this embodiment of the present invention is that the mask can comprise a data table with only a few data entries, which allows the compare logic to work quickly in a real time operating environment, yet still perform the comparisons with sufficient accuracy to be effective. The output from the compare logic circuit is a signal at 112, and its logic state will be determined by whether or not the profile envelope from the System 2 clock signal failed or passed the comparison test.

Figure 4A:
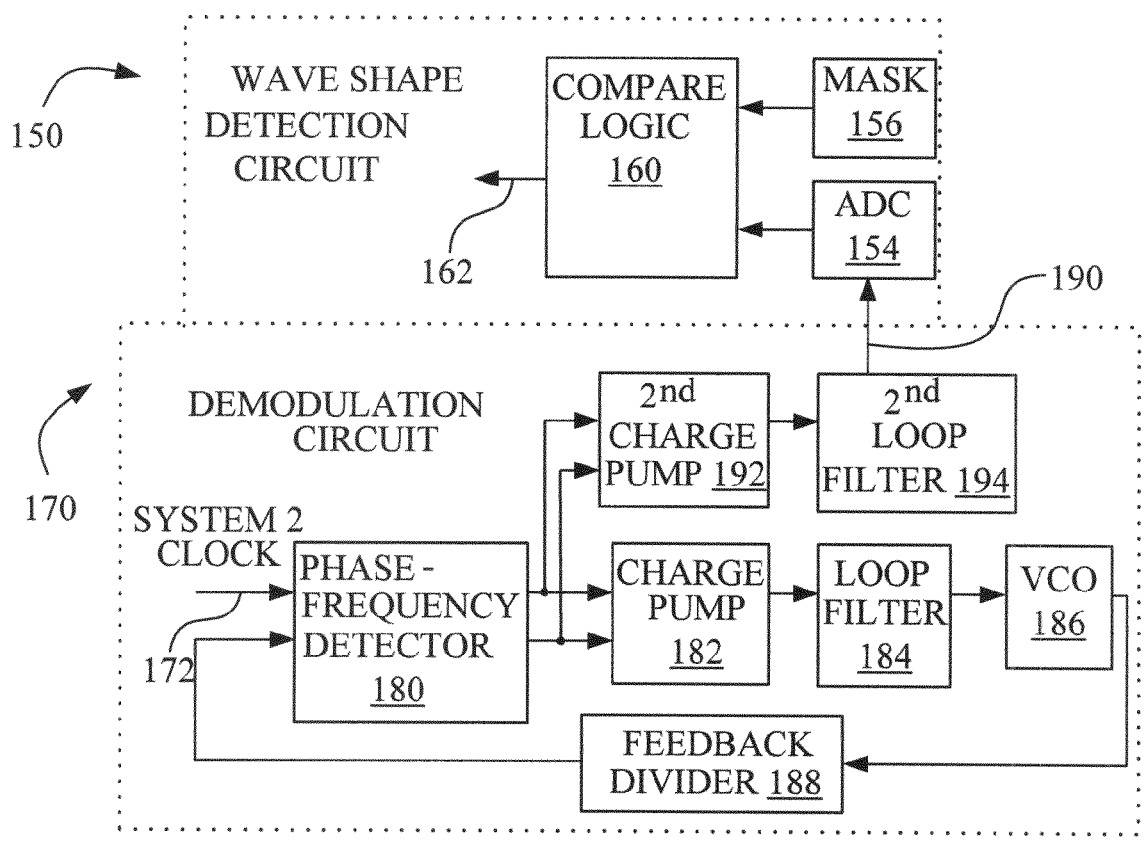
FIG. 4A is a block diagram of a second embodiment of a clock tracker/verification system (a clock interoperability system) of the present invention, using a dual charge pump configuration loop filter signal as the comparison vehicle.

A second embodiment is depicted in FIG. 4A, in which a wave shape detection circuit is generally designated by the reference numeral 150, and a demodulation circuit is generally designated by the reference numeral 170. This second embodiment uses a different method to provide a signal to the analog-to-digital converter.

The second embodiment of FIG. 4A uses a similar tracking phase locked loop (PLL), but with a different node used to interface with the comparison logic. For some PLLs, the signal level at the VCO input node is too small to use reliably. Instead of attaching to this VCO input node, the phase-frequency detector signals are sent to a second charge pump and loop filter. The second charge pump is more powerful than the PLL charge pump, and effectively provides more gain for the ADC (after being smoothed out by the second loop filter). For the most part, the ADC, mask, and compare logic are essentially equivalent between the first and second embodiments.

On FIG. 4A, the demodulation circuit 170 receives a System 2 clock signal at 172, which is directed to a phase-frequency detector 180. The outputs from the phase-frequency detector are directed to a PLL charge pump 182, and also to a second charge pump at 192. The PLL charge pump 182 has its output directed to a loop filter 184, which drives a VCO 186. The output from VCO 186 is directed to a feedback divider 188, and its output is directed back to the phase-frequency detector 180.

The second charge pump 192 has its output directed to a second loop filter 194, and its output signal at 190 is the variable voltage that is directed to the analog-to-digital converter 154 in the wave shape detection circuit 150. The mask 156 is essentially equivalent to the mask 106 of FIG. 3, and the compare logic 160 is essentially equivalent to the compare logic 110 of FIG. 3. The output signal from the compare logic in the second embodiment of FIG. 4A is at 162. Similar decisions are made by the comparison logic 160, based on the attributes of the mask 156.

Figure 4B:
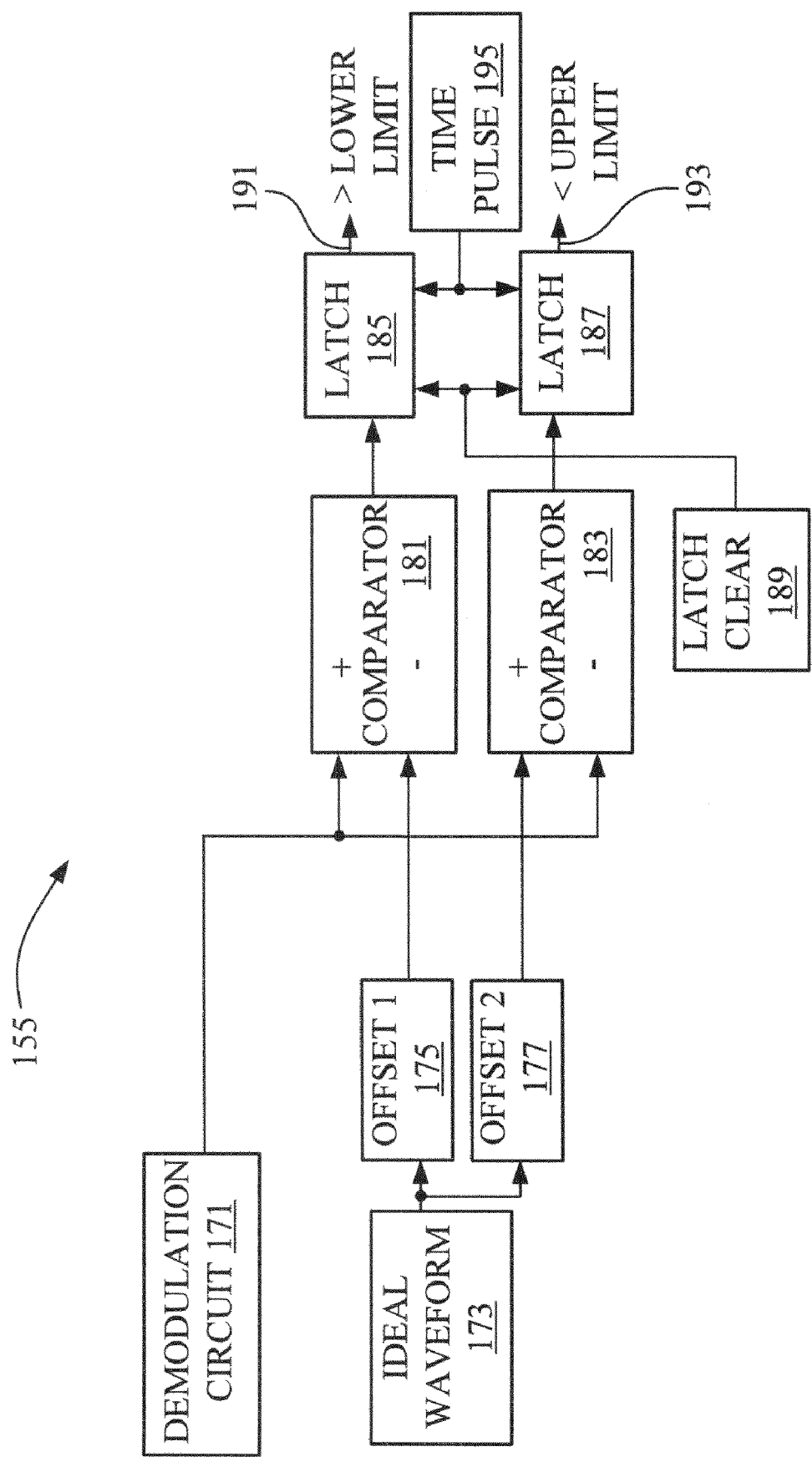
FIG. 4B is a block diagram of a third embodiment of a clock tracker/verification system (a clock interoperability system) of the present invention, using an analog comparing circuit to compare the demodulated waveform against an ideal waveform.

A third embodiment is presented by using a wave shape detection circuit, generally designated by the reference numeral 155 on FIG. 4B, that replaces the ADC with a circuit that compares the wave shape at a number of predetermined profile locations or times. This comparison would be used to determine if the SSCG profile is correct for the optimum shape.

The first step is to create an analog profile to match one of the shapes found in FIG. 1 (see U.S. Pat. No. 5,488,627 column 9, line 23). The preferred shape is the F5 profile. This can be done by first creating a voltage or current triangular wave. This can be simply done by applying a constant current into a capacitor that starts at the profile average value which creates a positive ramp and continues until the positive peak. At the peak time, the sign of the current source is made negative to cause a negative ramp from that peak. This creates a triangular wave from the zero (0) deviation through the peak and back to the zero (0) deviation point.

Next the triangle wave is run through a logarithmic amplifier which is multiplied by three (3) and results in a cubic function when the anti-logarithm is taken. A summing circuit is used to add 55% of the triangular wave to 45% of the cubic function to give a normalized upper half of the modulation. To get the negative half upper half waveform can be inverted to give the negative half. The resulting waveform is the ideal waveform that can be compared to the actual waveform of the SSCG output.

FIG. 4B shows a circuit that uses the ideal waveform to compare against the actual demodulated signal from the SSCG output being detected. The SSCG signal arrives at a demodulation circuit 171, and its output signal is directed to a pair of comparators 181 and 183. The "ideal waveform" signal is generated by a circuit 173, and is directed to a pair of offset circuits 175 and 177. The output signals of offset circuits 175 and 177, having two different offset values, are directed to comparators 181 and 183, respectively.

The output signals of comparators 181 and 183 are directed to a pair of latch circuits 185 and 187, respectively, which will change state if their individual comparators (either 181 or 183) ever have a high output state. A latch clear circuit 189 is used to select the time in the profile that the comparison is to start. The latch outputs 191 and 193 can be read at any time to determine if the profile limits have been exceeded. A time pulse signal 195 can be used to hold the state of the latches 185 and 187 so those latches can be read at a later time.

The Offsets 1 and 2 (i.e., offset circuits 175 and 177) are used to set the boundary range around the ideal profile that the actual modulation must stay within. A circuit like the one depicted in FIG. 5 may be necessary to synchronize the ideal waveform to the one being measured, to remove any time or phase shift that may be present.

A fourth embodiment is presented by using analog and digital circuitry to be the wave shape detection circuit to measure key aspects of the profile. The key aspects are the period, symmetry, amplitude and inflections of the profile. Referring back to FIG. 1, the period can be determined by finding the time between the zero (0) deviation crossings and adding the positive deviation half period to the negative deviation half period.

Figure 5:
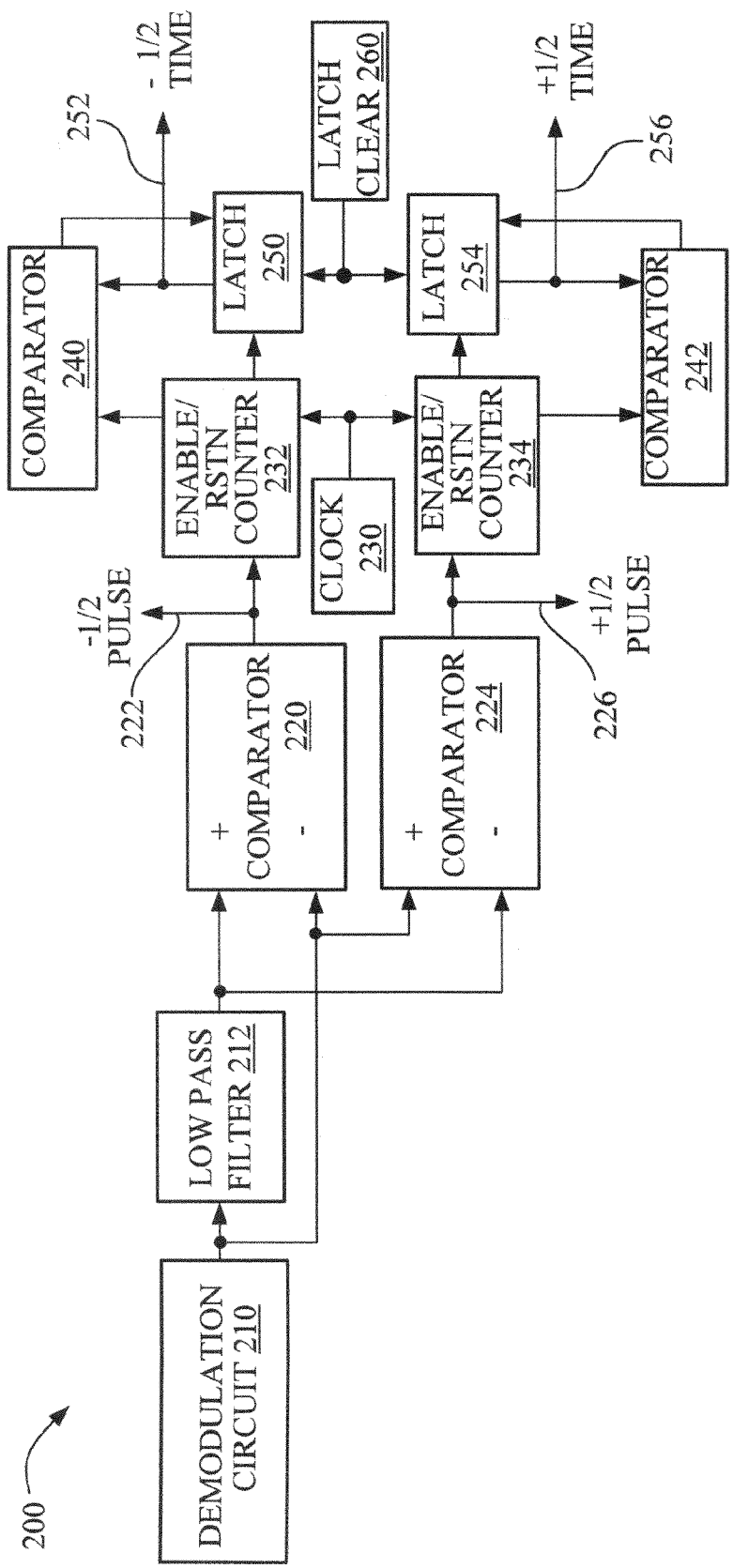
FIG. 5 is a block diagram showing an exemplary hardware circuit that acts as a wave shape detection circuit to determine positive and negative half-period times, as used in the present invention.

The fourth embodiment is depicted in FIG. 5, which shows a circuit 200 that can be used to determine the positive and negative ½ periods of the modulation waveform; these added together result in the modulation period. Symmetry can be checked by comparing the one-half period values that should be close to the same value if the area above and below the average are the same.

In the circuit 200, a demodulation circuit 210 sends a signal to a low pass filter 212 and also to a pair of comparators 220 and 224. The low pass filter 212 also outputs a signal to both comparators 220 and 224. The output signal of comparator 220 is the −½ pulse ("minus one-half pulse"), designated by reference numeral 222. The output signal from comparator 224 is called the +½ pulse ("plus one-half pulse"), designated by reference numeral 226.

The output signal 222 is directed to a counter 232, and the counter's output is directed to a comparator 240 and to a latch 250. The comparator output signal 226 is directed to a counter 234, and the counter's output is directed to a comparator 242 and to a latch 254.

A latch clear signal 260 is used to reset the latches 250 and 254 at appropriate times. Latches 250 and 254 also drive signals to their respective comparators 240 and 242. The outputs of these comparators are also used to drive inputs of the latches 250 and 254, as seen on FIG. 5. The output of latch 250 is a signal 252 that is also referred to as the "−½ time." The output of latch 254 is a signal 256 that is also referred to as "+½ time." These signals 252 and 256 have logic states that indicate when the positive and negative ½ periods of the modulation waveform occur.

Figure 6A:
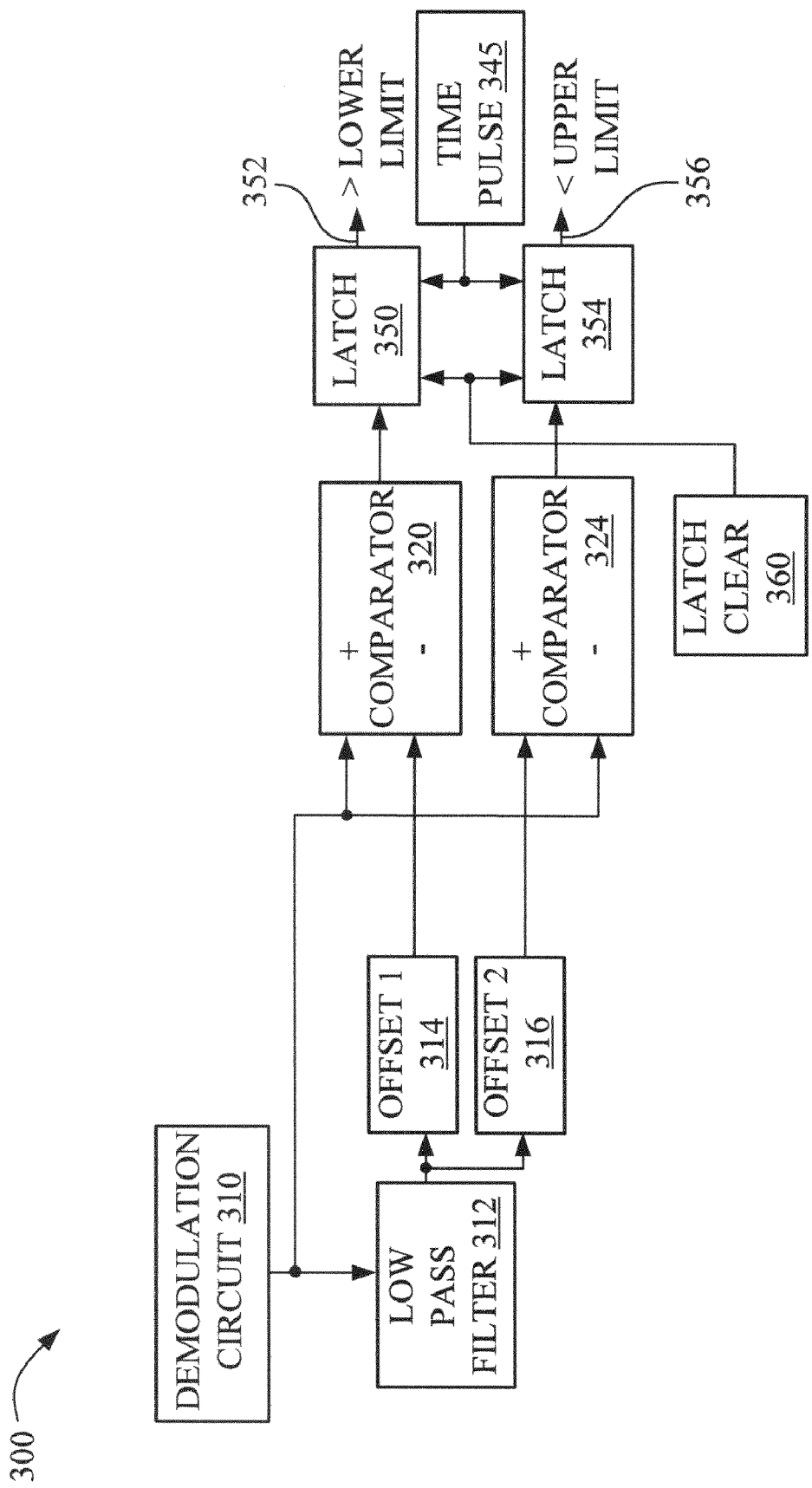
FIG. 6A is a block diagram showing an exemplary hardware circuit used for determining if the spread spectrum modulation is within a window at a predetermined time event.

The peak amplitude of the modulation, or peak deviation, can be found a number of ways. In FIGS. 3 and 4A, the positive and negative peak amplitudes may be determined by analyzing the output of the ADC stages. FIG. 6A shows a circuit 300 that can be used to determine if the modulation is within an upper and lower limit at a given time event. It should be noted that the circuit 300 operates without using a "mask," such as the mask 106 that was used in FIG. 3, or the mask 156 that was used in FIG. 4A.

In FIG. 6A, a demodulation circuit 310 provides a signal to a low pass filter 312 which drives an "Offset 1" signal at 314 and an "Offset 2" signal at 316. The output from the demodulation circuit 310 also is directed to a pair of comparators 320 and 324. The Offset 1 signal 314 is directed to comparator 320, while the Offset 2 signal 316 is directed to comparator 324.

Comparators 320 and 324 have output signals that are directed to a pair of latches 350 and 354. A latch clear signal 360 is used to reset the latches at the proper moments. A time pulse signal 345 is also directed to the latches 350 and 354, which is described below. The outputs of the latches 350 and 354 are signals 352 and 356, respectively.

The Offset values 1 and 2 (signals 314 and 316) are used to create a reference voltage (or current) that is then compared to the modulation waveform. The comparators 320 and 324 each output a Logic 1 or Logic 0 depending if the comparison is true or false. This value is then latched (by latches 350 and 354) when the time pulse 345 is given. This time pulse 345 corresponds to when the modulation should be within the predetermined offset values. Time pulse 345 acts as a "latch control signal" for this function.

Time pulse 345 can come when the modulation is at its peak amplitude, or at any other location in the waveform. The time pulse signal 345 is created by a counter (232 or 234) that is run from the clock 230 in FIG. 5. The counter 232 or 234 starts when the +½ or −½ pulse starts, and counts for a predetermined time. This time represents the location in the modulation waveform that is to be tested. If the peak amplitude is to be tested then the count will be equal to the number of clocks corresponding to one-fourth (¼) of the modulation period, as depicted in FIG. 1. (The negative peak could also be tested as an alternative, at the 75% point of the modulation period on FIG. 1, for example.)

Another key aspect of the profile is the inflection due to the linear and cubic terms in the modulation equation. This aspect can be easily measured using the same circuit in FIGS. 3, 4A and 6A by knowing the best time in the profile to make the comparison. In FIG. 1, the curves denoted by F3 and F4 are the boundaries for the near optimum modulation waveform with F5 being the preferred waveform. The location that has the highest difference between F3 and F4 is found by subtracting the F3 curve from the F4 curve and then differentiating the difference. The resulting equation is then solved for the time when the function equals zero. The resulting value is 0.577 of the time required to go from the zero (0) deviation time to the first peak modulation deviation. If this time is used then the inflection will be checked in an optimal way.

A derivation of this calculation is shown below, assuming that the first quadrant is scaled in time from 0 to 1:

$$f(t) = t - t^3$$
$$\frac{d}{dt} f(t) = 1 - 3 \cdot t^2 = 0$$
$$t := \sqrt{\frac{1}{3}}$$
$$t = 0.577$$

FIG. 6A shows general inputs to the comparators 320 and 324 from the low pass filter 312 and two offset circuits 314 and 316. For example, assume the demodulation circuit 310 produces a voltage waveform from 0 volts to 1 volt. If the profile is symmetric, the low pass filter 312 will produce a value of 0.5 volts. If at a given time in the profile the voltage should be 0.75 volts, then Offset 1 (314) might be set to 0.3 volts (for an input of 0.8 volts to the first comparator 320) and Offset 2 (316) might be set to 0.2 volts (for an input of 0.7 volts to the second comparator 324). The offset circuits would also be capable of providing negative voltages.

Figure 6B:
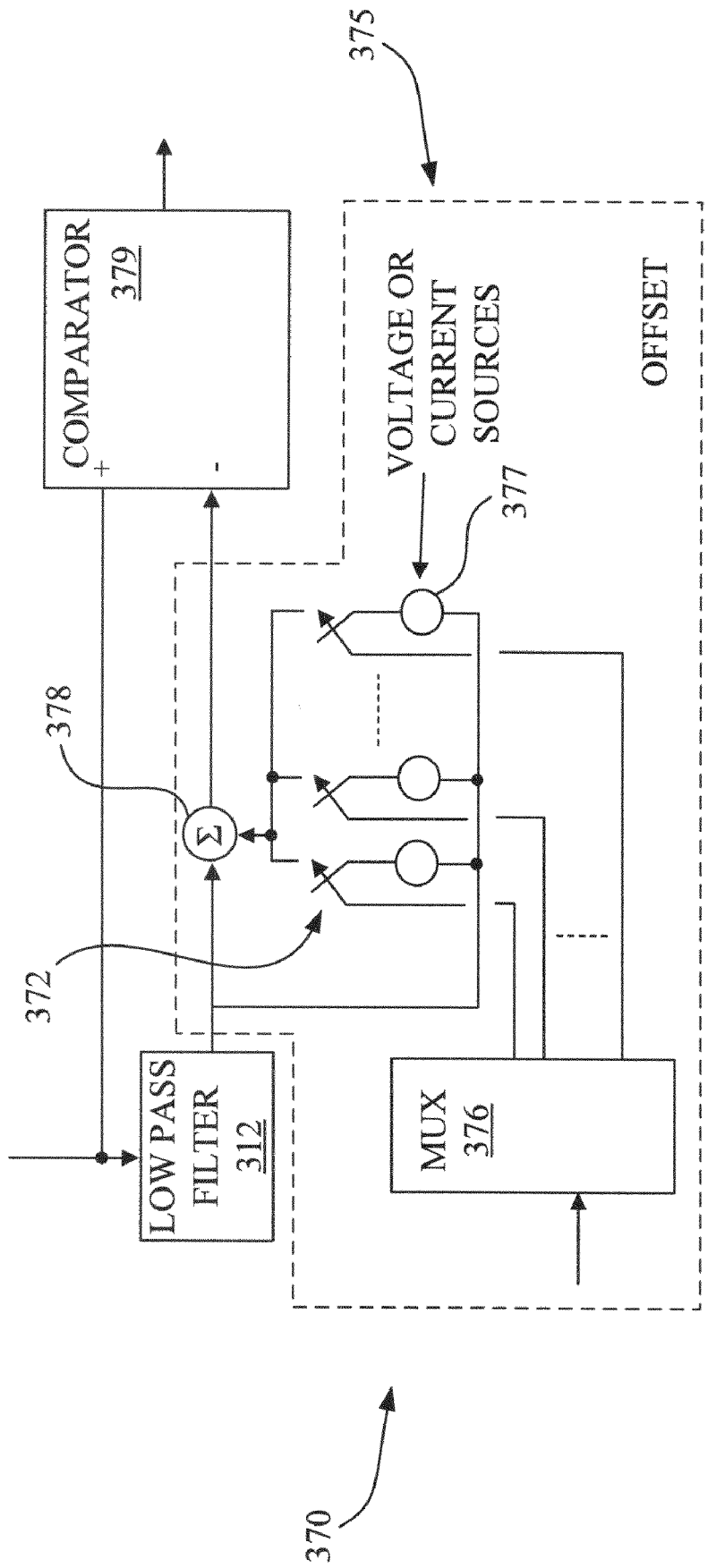
FIG. 6B is a block diagram showing a first exemplary hardware circuit used to create offsets for the circuit of FIG. 6A.

FIG. 6B shows one method of creating the offsets, using a circuit generally designated by the reference numeral 370. The Offset 1 or Offset 2 circuit is designated by the circuit components that are grouped as reference number 375. The input to the circuit 375 is produced by a low pass filter (which could be the filter 312 on FIG. 6). The output from the circuit 375 is directed to a comparator 379 (which could be comparator 320 for Offset 1, or comparator 324 for Offset 2, on FIG. 6A).

Several analog switches 372 are used to create predetermined offset voltages (or currents) for a given multiplexer input value, using a multiplexer (MUX) 376 and multiple analog voltage (or current) sources 377. The output voltages (or currents) of the analog switches 372 are summed by an adder circuit 378, which produces the output signal that is directed to the comparator 379.

The given MUX input value would also correspond to a predetermined time pulse setting. The MUX inputs may be addresses or external pins of the hardware circuit. The same type of circuit 370 is replicated for both Offset 1 and Offset 2. The inputs to Offsets 1 and 2 may be either independent or tied together. (On FIG. 6A, they are shown as being tied together.)

Figure 6C:
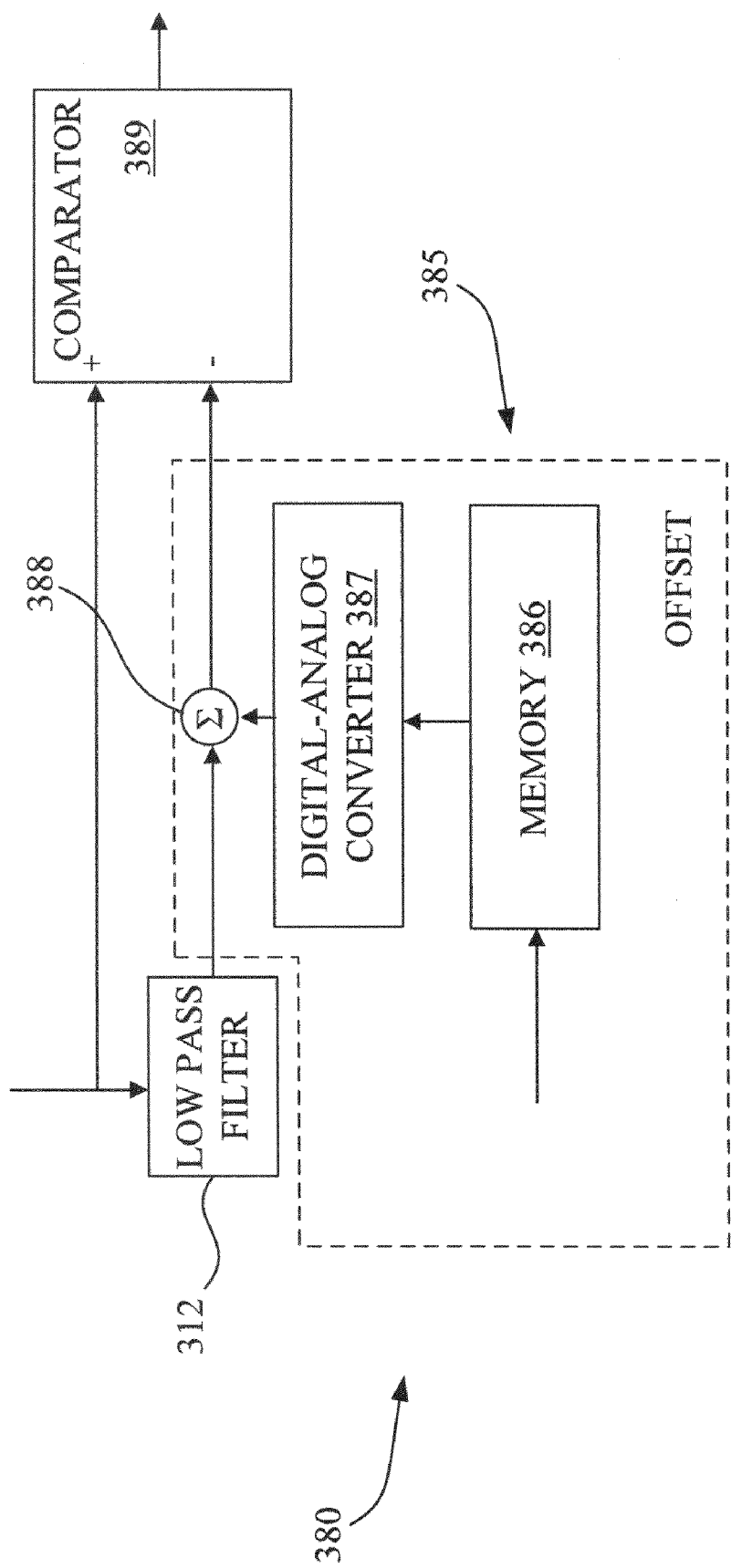
FIG. 6C is a block diagram showing a second exemplary hardware circuit used to create offsets for the circuit of FIG. 6A.

FIG. 6C shows another method of creating the offsets, using a circuit generally designated by the reference numeral 380. The Offset 1 or Offset 2 circuit is designated by the circuit components that are grouped as reference number 385. The input to the circuit 385 is produced by a low pass filter (which could be the filter 312 on FIG. 6A). The output from the circuit 385 is directed to a comparator 389 (which could be comparator 320 for Offset 1, or comparator 324 for Offset 2, on FIG. 6A).

This second method for creating offsets uses a memory space containing digital representations of the Offset voltages and a DAC (digital-to-analog converter) to convert them to an analog voltage. The memory elements are depicted at reference numeral 386, and could be random access memory (RAM) used with a sequential processing circuit, for example, or perhaps could be registers or other logic elements in an ASIC or used with a logic state machine circuit. When an appropriate memory element is activated, its binary numeric value will be loaded from the memory circuit 386 to a DAC circuit 387, where this binary numeric value is converted to a voltage magnitude. The output from the DAC 387 is summed with the voltage from the low pass filter 312 by an adder circuit 388. Its output is directed to a comparator 389 (which could be comparator 320 for Offset 1, or comparator 324 for Offset 2, on FIG. 6A).

The same type of circuit 380 is replicated for both Offset 1 and Offset 2. The inputs to Offsets 1 and 2 may be either independent or tied together. (On FIG. 6A, they are shown as being tied together.)

Figure 11:
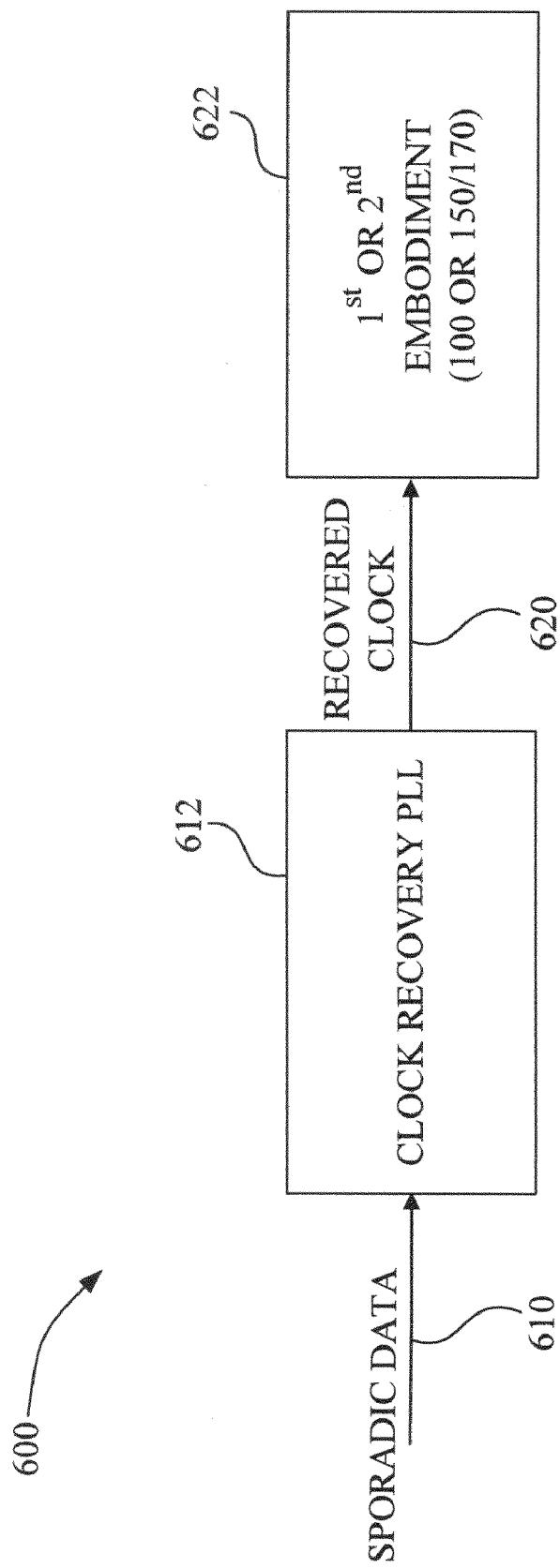
FIG. 11 is a block diagram showing an alternative embodiment of a clock interoperability system that uses a tracking phase-locked loop circuit to recover a clock signal from sporadic data, in which the clock of interest was originally used to create the data.

Alternate architectures for performing similar functions can be utilized. One such architecture is depicted in FIG. 11 as a simple block diagram. FIG. 11 is a "clock recovery embodiment" generally designated by the reference numeral 600, in which a high-speed tracking PLL recreates a clock from sporadic data instead of tracking a clock directly. This is a well-known technique to recover the clock that was originally used to create the data, which only requires that there are enough data edges to perform the recovery. Once the clock is recovered, it can be analyzed as in one of the previous embodiments.

The sporadic data arrives at a signal input 610 to a clock recovery phase locked loop 612 (e.g., a high-speed tracking PLL). This PLL 612 recreates or "recovers" a clock signal from the sporadic data, and outputs that recovered clock signal at 620, which is input to a clock tracker/verification system 622. For example, this clock tracker/verification system 622 could be a circuit that is identical to one of the first or second embodiments (100 or the combination of 150 and 170) discussed herein.

Figure 7:
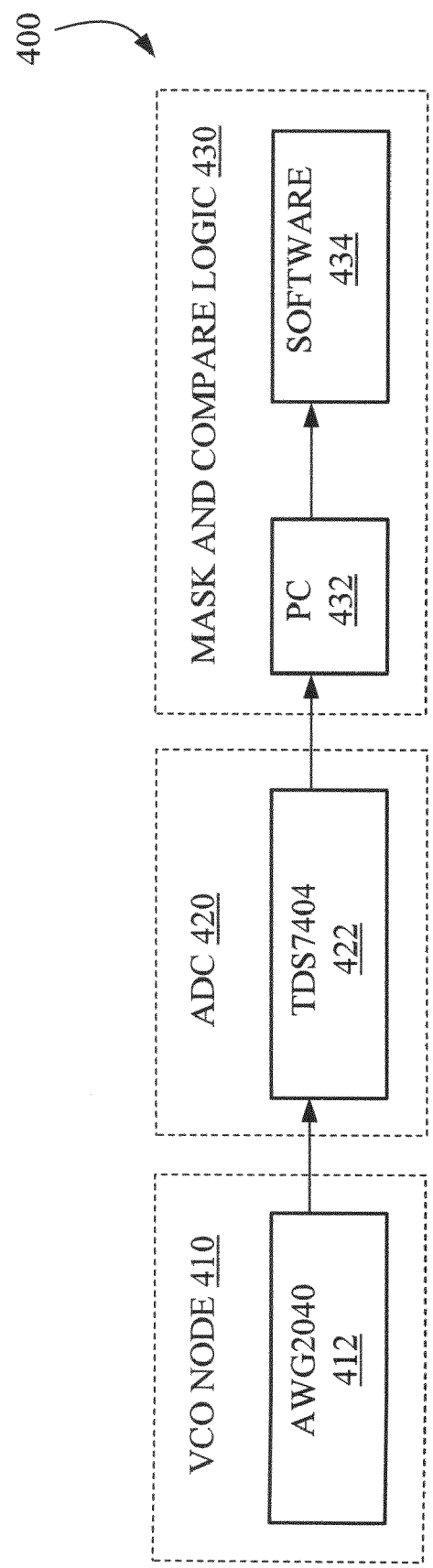
FIG. 7 is a block diagram showing an experimental test circuit of a clock interoperability system that has been implemented for testing the first embodiment described above, including the type of test equipment.

The first embodiment described above in FIG. 3 has been implemented and tested in laboratory conditions. FIG. 7 shows the block diagram 400 of the lab implementation. It is well-known that the node before a VCO in a tracking PLL is an analog voltage representation of the frequency modulation on a signal. Therefore, this node at 410 was represented in the lab by an arbitrary waveform generator (AWG2040) 412. A TDS7404 Oscilloscope 422 digitally captured these waveforms, performing the stage of analog to digital converter (ADC) at 420. A computer 432 ("PC") copied these sampled waveforms and used a C++ program 434 to compare the waveforms to an ideal Lexmark profile. This C++ program represented the Mask and Compare Logic at 430.

Figure 8A:
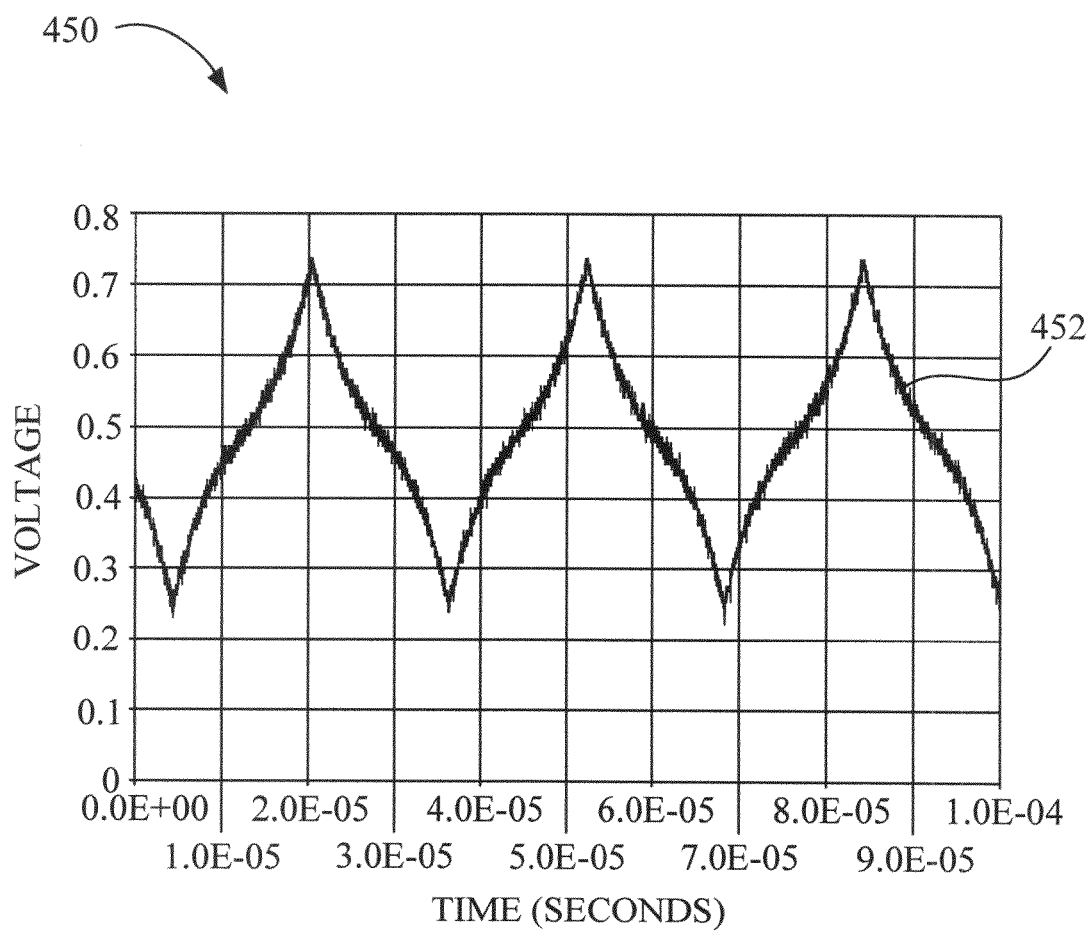
FIG. 8A is a graph showing several periods of a sampled "Lexmark" modulation profile, according to the present invention.
Figure 8B:
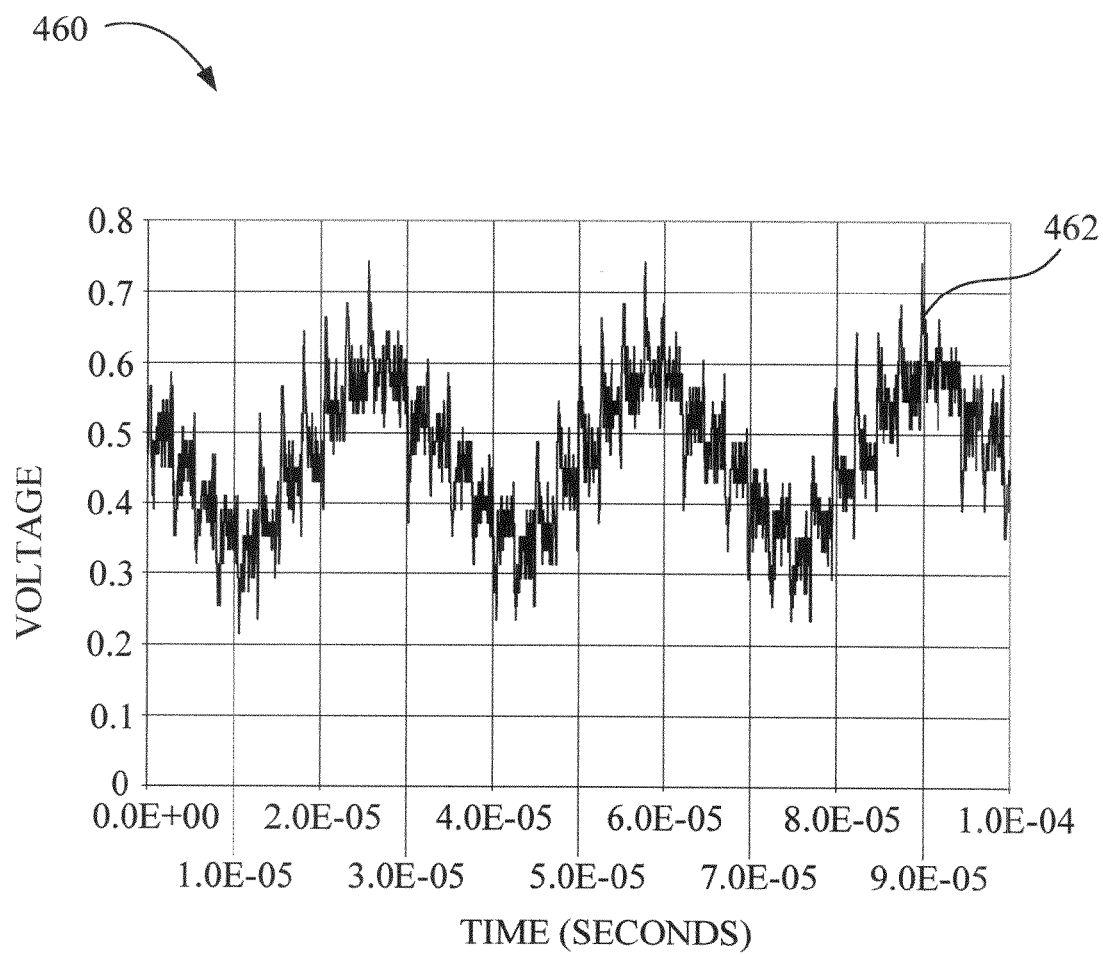
FIG. 8B is a graph showing several periods of a sampled modulation profile that was generated by an SSCG clock manufactured by a different company.
Figure 10A:
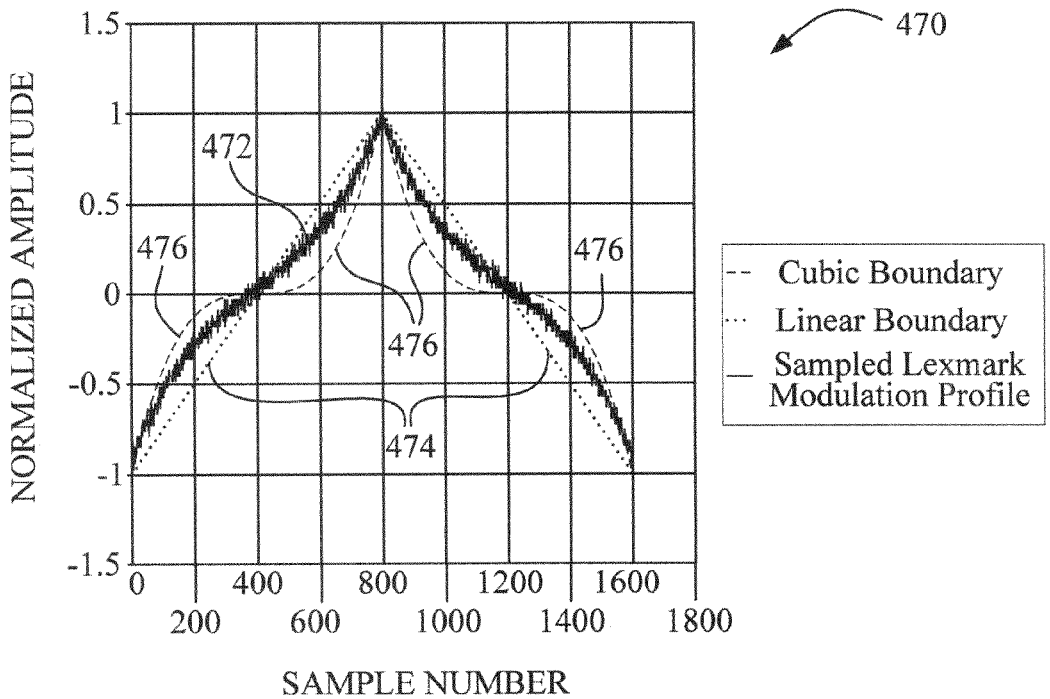
FIG. 10A is a graph showing the boundary mask overlaid on a sampled "Lexmark" modulation profile.
Figure 10B:
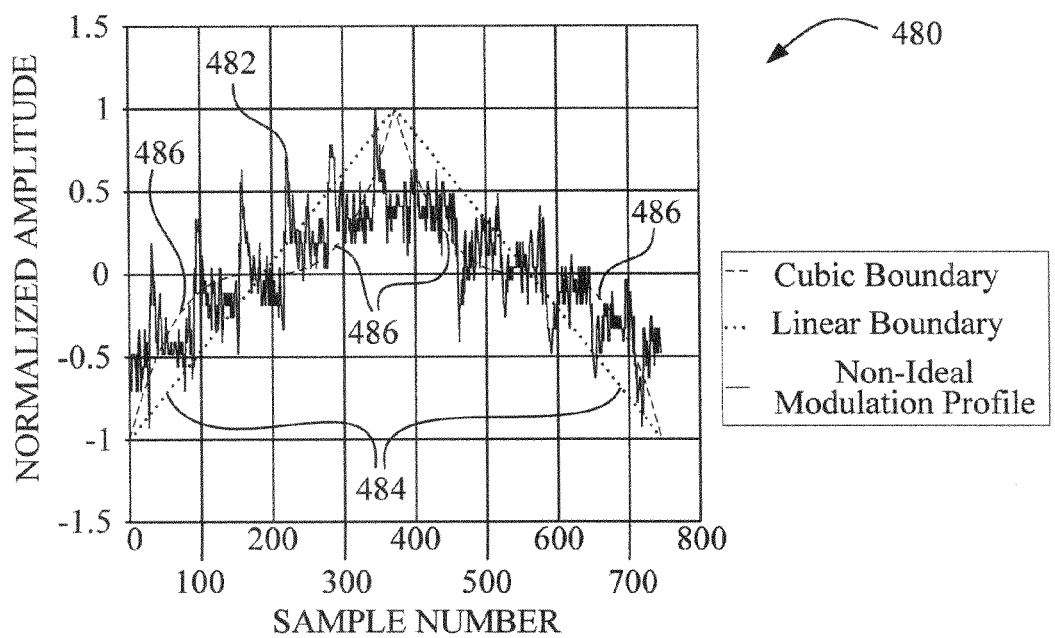
FIG. 10B is a graph showing the boundary mask overlaid on a sampled non-ideal modulation profile.

FIGS. 8A and 8B illustrate the sampled waveforms from the TDS7404. The waveform 452 in FIG. 8A is a typical Lexmark modulation profile. This is often referred to the "Lexmark" spread spectrum profile. The waveform 462 in FIG. 8B is taken from an older SSCG part manufactured by a different company. The modulation profile shown in FIG. 10B represents a waveform that would be rejected, using the present invention.

FIG. 8A is a graph 450 that shows an optimized modulation profile 452. FIG. 8B is a graph 460 that shows a non-optimized modulation profile 462, which has samples that wildly vary as compared to the ideal profile in FIG. 8A. If a single sample is used to check one of these critical aspects, it is possible to misidentify the profile. To combat this problem a number of samples at a specific time, or at different times, can be used to determine with high confidence that the optimized profile is used.

Figure 9:
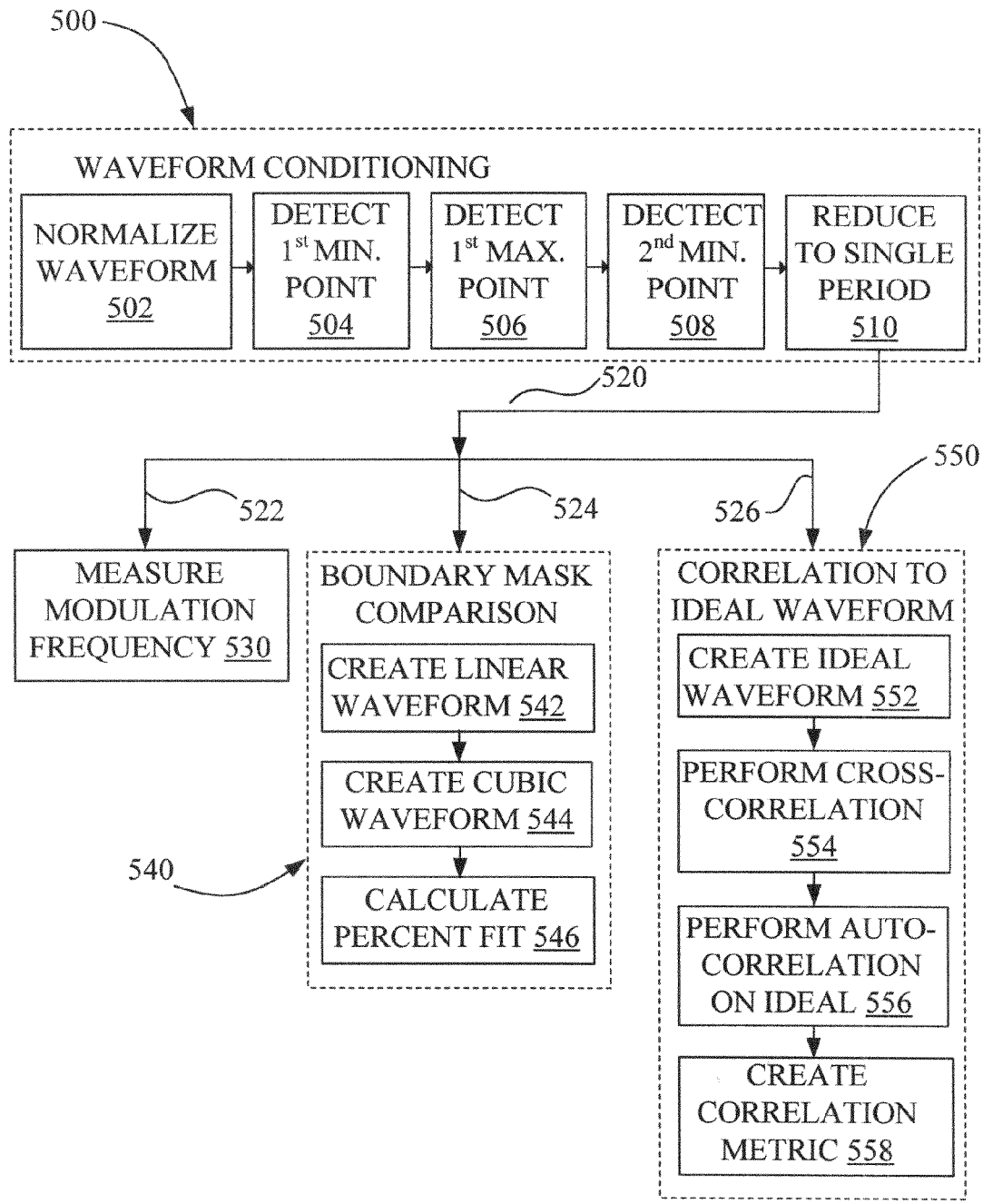
FIG. 9 is an illustrative flow chart comparing a sampled SSCG modulation profile to the ideal waveform of a "Lexmark" modulation profile.

Three tests were implemented to provide a pass/fail metric on modulation shape. These may be used singly or in conjunction in a product to determine the suitability of the profile. The three implemented comparison filters were: (1) boundary mask comparison, (2) correlation to an ideal waveform, and (3) modulation frequency detection. FIG. 9 is a flow chart that shows the basic steps involved in the comparison software.

In FIG. 9, a waveform conditioning function 500 is used before any comparisons were made. The goal of conditioning function 500 is to take a sampled waveform with multiple periods of the modulation profile and extract a single period for comparison purposes. At a step 502, the waveform is normalized to extend from a minimum value of −1 to a maximum value of +1. Next, at a step 504, a threshold is used to determine a "time bracket" (i.e., a set of boundaries along the time axis) around the first minimum point. Since the ideal Lexmark modulation profile is symmetric, the start of the modulation period can be determined to be the point halfway between the "ends" of the time bracket. The purpose of this threshold test is to find repeatable, well-defined points (e.g., peaks or valleys in the waveform) to act as the ends (or boundaries) of the time bracket.

At a step 506, the same process determines another time bracket (again using a time bracket threshold test) around the first maximum point and thus determines the midpoint of the modulation period. The next (second) minimum point is then found at a step 508 (again using a time bracket threshold test), and is considered the end of the modulation period. This section of the sampled waveform is then extracted and re-normalized; also, it is reduced to a single period at a step 510. The extracted waveform segment is then used as a basis for further comparisons, along the logic flow 520.

As noted above, three functions have been implemented and tested to provide a pass/fail metric on modulation shape. For the printer system 50, should the modulation shape fail, the field replaceable unit generating that modulation shape can be disabled or the printer can be placed in a predetermined operational state such as halting printing or scanning and/or displaying an error message to the user. On FIG. 9, these three functions are used by directing the logic flow along the lines 522, 524, and 526.

Once the modulation profile is conditioned, the associated time stamps combined with the extracted waveform segment allow for the calculation of the modulation frequency at a function or step 530. Bounds can then be placed on allowable modulation frequency. Many SSCG clock chips on the market have predetermined modulation frequencies that are difficult to change. It is possible to require "approved" products to use an uncommon modulation frequency that can be detected using the above method.

The second comparison method investigated in the lab was the Boundary Mask, at a function 540. This is the main method envisioned by the embodiments described above. Once the modulation profile is extracted from the sampled waveform, two boundary masks are created based on the extracted waveform length. One boundary is the linear modulation profile, created at a step 542, and the other is the cubic profile, created at a step 544. Next the mask is overlaid on top of the sampled waveforms (see FIGS. 10A and 10B, for example) and the percent of the waveform inscribed within the mask is calculated at a step 546.

Typically more than 80% of a typical "Lexmark" modulation profile would fit within the boundary mask. An unacceptable modulation profile would typically fit within the mask less than 50% of the time. For the sampled waveforms in FIGS. 8A and 8B, the percent fit was 88.68% and 39.09%, respectively.

Additionally, other masks can be used to test for known profile variations that indicate known problems with spread spectrum clock generators. If these other masks identify a problem with the profile, and there is an ability to modify the PLL parameters in the peripheral part, then the modulation profile can be adjusted for improved performance.

An alternative to performing a boundary mask operation is to use a Fast Fourier Transform (FFT) correlation routine 550. Once the sampled waveform is extracted, an ideal waveform is created of the same length, at a step 552. The two waveforms are compared using a cross-correlation routine, at a step 554. Basically the cross-correlation routine time-shifts the two waveforms and compares how similar they are at each time-shift. Since the two waveforms were already phase-aligned, the maximum "likeness" value occurred at a zero time-shift. The maximum value of the correlation result is kept as a part of the metric for comparison, at a step 558.

Since the correlation values typically are partially dependent on the length of the waveforms, the resulting values need to be normalized. This is accomplished by using an autocorrelation of the ideal waveform, at a step 556. This is where the ideal waveform is correlated to itself, creating a value of maximum possible likeness. The maximum value from this auto-correlation is used to normalize the correlation metric (maximum correlation value/maximum autocorrelation value=normalized correlation metric), at step 558. The more similar the sampled waveform is to the ideal waveform, the closer the normalized correlation metric approaches 1.

Using the two sampled waveforms in FIGS. 6A and 6B, the normalized correlation metric was 0.96 and 0.64, respectively. An appropriate number for the pass/fail criteria was a correlation greater than 0.85.

The present invention provides a system and method for controlling electronic devices that use a spread spectrum clock generator, including image forming devices, such as printers. The term image as used herein encompasses any printed or digital form of text, graphic, or combination thereof. The term output as used herein encompasses output from any printing device such as color and black-and-white copiers, color and black-and-white printers, and so-called "all-in-one devices" that incorporate multiple functions such as scanning, copying, and printing capabilities in one device. Such printing devices may utilize ink jet, dot matrix, dye sublimation, laser, and any other suitable print formats. A multifunction machine is also sometimes referred to in the art as an all-in-one (AIO) unit. Those skilled in the art will recognize that an imaging apparatus may be, for example, an ink jet printer/copier; an electrophotographic printer/copier; a thermal transfer printer/copier; other mechanism including at least a scanner system.

The printer system controller 50 typically includes a processor circuit and associated memory circuit, and may be formed as one or more Application Specific Integrated Circuits (ASIC). Its memory may be, for example, random access memory (RAM), read only memory (ROM), and/or non-volatile RAM (NVRAM). Alternatively, the memory circuit may be in the form of a separate electronic memory (e.g., RAM, ROM, and/or NVRAM), a hard drive, a CD or DVD drive, or any memory device convenient for use with controller 50. Controller 50 may be, for example, a combined printer and scanner controller.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A clock interoperability circuit, comprising:
   (a) an input circuit for receiving a first spread spectrum clock signal from an external device, said input circuit having a converter circuit that converts said first spread spectrum clock signal to a second demodulated signal;
   (b) a memory circuit that stores a predetermined mask, in which said mask comprises at least one data attribute that is to be used for inspecting said second demodulated signal; and
   (c) a compare logic circuit for:
      (i) reading said at least one data attribute of said predetermined mask, and using said at least one data attribute to define a set of boundary conditions;
      (ii) reading said second demodulated signal from said input circuit, and determining a wave shape of a modulation profile of said second demodulated signal; and
      (iii) comparing the wave shape of said second demodulated signal's modulation profile to said set of boundary conditions, and determining whether the wave shape of said second demodulated signal's modulation profile is statistically within said set of boundary conditions.

2. The clock interoperability circuit of claim 1, wherein said input circuit includes an analog-to-digital converter circuit, and a demodulation circuit having a tracking phase-locked loop circuit that receives said first spread spectrum clock signal; wherein:
   (a) said tracking phase-locked loop circuit attempts to emulate the frequency attributes of said first spread spectrum clock signal; and
   (b) said tracking phase-locked loop circuit outputs a third signal from within the loop circuit itself, and the third signal is directed to said analog-to-digital converter.

3. The clock interoperability circuit of claim 2, wherein said tracking phase-locked loop circuit outputs said third signal from one of:
   (a) a node between a loop filter and a voltage-controlled oscillator;
   (b) a node between a first phase-frequency detector and a first charge pump; and
   (c) a second loop filter and a second charge pump, which receives a fourth signal from a node between said first phase-frequency detector and said first charge pump.

4. The clock interoperability circuit of claim 1, wherein said compare logic circuit further:
   (a) determines at least one positive one-half pulse period by detecting zero deviation crossings;
   (b) determines at least one negative one-half pulse period by detecting zero deviation crossings; and
   (c) adds said at least one positive one-half pulse period and said at least one negative one-half pulse period to calculate a modulation period of said first spread spectrum clock signal.

5. The clock interoperability circuit of claim 1, further comprising:
   (a) a subsystem device that generates said first spread spectrum clock signal, said subsystem device including a first spread spectrum clock generator circuit; and
   (b) an output circuit controlled by said clock interoperability circuit that generates a fifth control signal that is directed to said subsystem device, wherein said fifth control signal is used to adjust said first spread spectrum clock generator circuit to compensate for process variations in said first spread spectrum clock generator circuit.

6. The clock interoperability circuit of claim 1, further comprising:
   (a) a subsystem device that generates said first spread spectrum clock signal, said subsystem device including a first spread spectrum clock generator circuit; and
   (b) a system device that contains said input circuit, said memory circuit, and said compare logic circuit, wherein said compare logic circuit verifies that said first spread spectrum clock generator circuit complies with predetermined electromagnetic radiation limits.

7. The clock interoperability circuit of claim 6, wherein if said first spread spectrum clock generator circuit fails said verification function, then said system device will enter a predetermined state.

8. The clock interoperability circuit of claim 1, further comprising:
   (a) a first subsystem device that includes a first spread spectrum clock generator circuit which generates said first spread spectrum clock signal;
   (b) a second subsystem device that includes a second spread spectrum clock generator circuit which generates a second spread spectrum clock signal;
   (c) a first output circuit controlled by said clock interoperability circuit that generates a fifth control signal that is directed to said first subsystem device; and
   (d) a second output circuit controlled by said clock interoperability circuit that generates a sixth control signal that is directed to said second subsystem device;
   wherein said fifth control signal is used to control predetermined operating parameters of said first spread spectrum clock generator circuit, and said sixth control signal is used to control predetermined operating parameters of said second spread spectrum clock generator circuit, such that said fifth and sixth control signals substantially prevent overlap of clock output frequencies between said first and second spread spectrum clock generator circuits.

9. The clock interoperability circuit of claim 1, wherein said input circuit, said memory circuit, and said compare logic circuit are resident on an image forming device; further comprising:
   (a) a first subsystem device that includes a first spread spectrum clock generator circuit which generates said first spread spectrum clock signal;

(b) a second spread spectrum clock generator circuit that is resident on said image forming device, wherein said second spread spectrum clock generator circuit generates a second spread spectrum clock signal; and (c) an output circuit that is resident on said image forming device, which is controlled by said clock interoperability circuit, and which generates a fifth control signal that is directed to said first subsystem device;

wherein said fifth control signal is used to control predetermined operating parameters of said first spread spectrum clock generator circuit, such that said fifth control signal substantially prevents overlap of clock output frequencies between said first and second spread spectrum clock generator circuits.

10. The clock interoperability circuit of claim 1, wherein said input circuit, said memory circuit, and said compare logic circuit are resident on an image forming device; further comprising:

(a) a first subsystem device that includes a first spread spectrum clock generator circuit which generates said first spread spectrum clock signal; and (b) an output circuit that is resident on said image forming device, which is controlled by said clock interoperability circuit, and which generates a fifth control signal that is directed to said first subsystem device;

wherein said fifth control signal is used to adjust predetermined operating parameters of said first spread spectrum clock generator circuit to compensate for process variations in said first spread spectrum clock generator circuit.

11. The clock interoperability circuit of claim 1, wherein said input circuit, said memory circuit, and said compare logic circuit are resident on an image forming device; and further comprising:

a first subsystem device that includes a first spread spectrum clock generator circuit which generates said first spread spectrum clock signal; wherein said compare logic circuit verifies that said first spread spectrum clock generator circuit complies with predetermined electromagnetic radiation limits.

12. The clock interoperability circuit of claim 11, wherein if said first spread spectrum clock generator circuit fails said verification function, then said image forming device will be placed in a predetermined state.

13. A spread spectrum clock signal inspection circuit, comprising:

(a) a demodulation circuit that receives from a device a first spread spectrum clock signal, said first spread spectrum clock signal having a modulation profile, said demodulation circuit converting said first spread spectrum clock signal to a second analog signal;

(b) a low pass filter circuit that receives said second analog signal, and outputs a third analog signal;

(c) a plurality of offset circuits that receive said third analog signal, and that output a plurality of fourth analog signals, said offset circuits having predetermined offset values; and (d) a plurality of comparator circuits that receive said second analog signal from said demodulation circuit and said plurality of fourth analog signals from said plurality of offset circuits, said comparator circuits outputting a plurality of fifth digital signals;

wherein logic states of said plurality of fifth digital signals are indicative of whether or not a waveform of said first spread spectrum clock signal modulation profile is within predetermined values, as determined by said predetermined offset values of the plurality of offset circuits.

14. The spread spectrum clock signal inspection circuit of claim 13, wherein said logic states of the plurality of fifth digital signals are inspected at a time of interest that occurs when two test waveforms are substantially at their greatest difference values, in which said two test waveforms comprise: (a) a linear minimum-maximum cyclic function; and (b) a cubic function of an optimum modulation profile waveform known as a "Lexmark" spread spectrum profile.

15. The spread spectrum clock signal inspection circuit of claim 13, further comprising a plurality of latch circuits that receive said plurality of fifth digital signals from said plurality of comparator circuits, and that receive a sixth latch control signal at a time that is of interest to inspect a logic state of said plurality of fifth digital signals, wherein upon receiving said sixth latch control signal, said plurality of latch circuits store said logic state of said plurality of fifth digital signals until a later moment in time.

16. The spread spectrum clock signal inspection circuit of claim 15, wherein said sixth latch control signal occurs when two test waveforms are substantially at their greatest difference values, in which said two test waveforms comprise: (a) a linear minimum-maximum cyclic function; and (b) a cubic function of an optimum modulation profile waveform known as a "Lexmark" spread spectrum profile.

17. A method for inspecting a spread spectrum clock signal, comprising:

(a) providing a subsystem device which includes a first spread spectrum clock generator circuit that generates a first spread spectrum clock signal;

(b) outputting said first spread spectrum clock signal using a first output circuit;

(c) determining, at a device in communication with the subsystem, a modulation profile waveform of said first spread spectrum clock signal;

(d) determining, at said device in communication with the subsystem, a set of boundary conditions;

(e) comparing, at said device in communication with the subsystem, said modulation profile waveform of said first spread spectrum clock signal to said set of boundary conditions; and (f) determining, at said device in communication with the subsystem, and based upon said comparison, whether the modulation profile waveform of said first spread spectrum clock signal is statistically within said set of boundary conditions.

18. The method of claim 17, wherein said set of boundary conditions comprises two test waveforms as follows: (a) a linear minimum-maximum cyclic function; and (b) a cubic function of an optimum modulation profile waveform known as a "Lexmark" spread spectrum profile.

19. The method of claim 17, further comprising:

(a) providing a system device that includes a first input circuit, and a clock tracker/verification control circuit;

(b) receiving at said first input circuit said first spread spectrum clock signal from the first output circuit of said subsystem device; and (c) performing, at said clock tracker/verification control circuit, said steps of:

(i) determining said modulation profile waveform of said first spread spectrum clock signal received at said first input circuit;

(ii) determining said set of boundary conditions;

(iii) comparing said modulation profile waveform of said first spread spectrum clock signal to said set of boundary conditions; and
(iv) determining whether the modulation profile waveform of said first spread spectrum clock signal is statistically within said set of boundary conditions.

20. The method of claim 19, further comprising:
(a) providing a second input circuit at said subsystem device;
(b) providing a second output circuit at said system device that is in communication with the second input circuit of said subsystem device;
(c) sending a control signal, generated at said clock tracker/verification control circuit, to said subsystem device, using said second output circuit; and
(d) adjusting, by use of said control signal, the operating characteristics of said first spread spectrum clock generator circuit.

21. The method of claim 20, wherein said step of adjusting the operating characteristics of said first spread spectrum clock generator circuit is for the purpose of at least one of:
(a) compensating for process variations in said first spread spectrum clock generator circuit;
(b) verifying that said first spread spectrum clock generator circuit complies with predetermined radiation limits;
(c) preventing overlap of clock frequencies between said first spread spectrum clock generator circuit at the subsystem and a second spread spectrum clock generator circuit at the system device; and
(d) verifying that said first spread spectrum clock generator circuit complies with predetermined radiation limits, wherein if said first spread spectrum clock generator circuit fails said verification function, then said system device will be placed in a predetermined condition.

22. The method of claim 19, wherein said system device comprises a printer and said subsystem device comprises a field replaceable unit, and said step of determining whether the modulation profile waveform of said first spread spectrum clock signal is statistically within said set of boundary conditions tends to assist in authenticating said field replaceable unit.

23. The method of claim 22, wherein said field replaceable unit comprises one of:
a toner cartridge, an ink cartridge, a paper input feeder, a paper output handler, a photoconductive element, a fuser unit, an image transfer member, a developer unit and an ink nozzle subassembly.

* * * * *